US010642715B1

(12) United States Patent
Simca et al.

(10) Patent No.: US 10,642,715 B1
(45) Date of Patent: May 5, 2020

(54) DYNAMIC AUTHORIZATION OF REQUESTED ACTIONS USING ADAPTIVE CONTEXT-BASED MATCHING

(71) Applicant: CyberArk Software Ltd., Petach-Tikva (IL)

(72) Inventors: Dor Simca, Oranit (IL); Tal Kandel, Pardes Hana Karkur (IL); Alex Gelman, Petach-Tikva (IL); Daniel Schwartzer, Petach-Tikva (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 16/281,313

(22) Filed: Feb. 21, 2019

(51) Int. Cl.
*G06F 9/44* (2018.01)
*G06F 11/36* (2006.01)
*G06F 11/34* (2006.01)

(52) U.S. Cl.
CPC ...... *G06F 11/3612* (2013.01); *G06F 11/3409* (2013.01); *G06F 11/3438* (2013.01); *G06F 11/3476* (2013.01)

(58) Field of Classification Search
CPC .................................................. G06F 11/3612
USPC .................................................. 717/100, 124
See application file for complete search history.

(56) References Cited

U.S. PATENT DOCUMENTS

| | | | | |
|---|---|---|---|---|
| 6,381,628 B1* | 4/2002 | Hunt | ....................... | G06F 9/465 709/201 |
| 7,013,456 B1* | 3/2006 | Van Dyke | ............ | G06F 9/45533 712/208 |
| 8,065,665 B1* | 11/2011 | Kosche | .................... | G06F 8/443 717/127 |
| 8,839,036 B2* | 9/2014 | Rymeski | ............. | G06F 11/0709 714/25 |
| 9,300,686 B2* | 3/2016 | Pidathala | ............ | H04L 63/1433 |
| 10,230,720 B2* | 3/2019 | Raepple | ................ | G06F 21/335 |
| 10,255,061 B2* | 4/2019 | Lander | ................ | G06F 11/3688 |
| 10,554,507 B1* | 2/2020 | Siddiqui | ............... | G06F 21/552 |
| 10,565,378 B1* | 2/2020 | Vincent | ................ | G06F 9/4881 |
| 10,567,405 B1* | 2/2020 | Aziz | .................... | G06F 9/45558 |

(Continued)

OTHER PUBLICATIONS

Kennedy A. Torkura et al. "Integrating Continuous Security Assessments in Microservices and Cloud Native Applications"; Session: Containerized Environments and Applications UCC'17, Dec. 5-8, 2017, Austin, Texas, USA.*

(Continued)

*Primary Examiner* — Francisco J Aponte
(74) *Attorney, Agent, or Firm* — Finnegan, Henderson, Farabow, Garrett & Dunner LLP

(57) ABSTRACT

Disclosed embodiments relate to context-based analysis of requested activities. Techniques include building dynamic context profiles for processes based on static parameters of the processes, dynamic parameters of the processes, and detected activity involving the processes; receiving an indication of current runtime activity involving at least one identity; matching the indication of current runtime activity to a dynamic context profile; determining a context-based probability that the current runtime activity is anomalous, suspicious, or non-valid with respect to the dynamic context profile; and performing a control action in association with either the current runtime activity or the process based on whether the current runtime activity is determined to be anomalous, suspicious, or non-valid.

19 Claims, 8 Drawing Sheets

(56) References Cited

U.S. PATENT DOCUMENTS

| | | | |
|---|---|---|---|
| 2004/0019832 A1* | 1/2004 | Arnold | G06F 21/51 |
| | | | 714/38.14 |
| 2011/0055619 A1* | 3/2011 | Bhatnagar | G06F 11/0709 |
| | | | 714/2 |
| 2016/0231999 A1* | 8/2016 | Holler | G06F 9/44 |
| 2017/0329957 A1* | 11/2017 | Vepa | G06F 21/445 |
| 2017/0331812 A1* | 11/2017 | Lander | H04L 63/0815 |
| 2017/0331813 A1* | 11/2017 | Lander | H04L 63/0815 |
| 2018/0039501 A1* | 2/2018 | Jain | G06F 9/451 |
| 2018/0075231 A1* | 3/2018 | Subramanian | G06F 21/41 |
| 2018/0077144 A1* | 3/2018 | Gangawane | H04L 63/10 |
| 2018/0083915 A1* | 3/2018 | Medam | H04L 63/0815 |
| 2018/0097802 A1* | 4/2018 | Lander | H04L 63/0815 |
| 2018/0337914 A1* | 11/2018 | Mohamad Abdul | |
| | | | H04L 9/0894 |
| 2019/0089809 A1* | 3/2019 | Theebaprakasam | |
| | | | G06F 11/3082 |
| 2019/0095516 A1* | 3/2019 | Srinivasan | H04L 63/10 |
| 2019/0098056 A1* | 3/2019 | Pitre | H04L 63/20 |
| 2019/0102162 A1* | 4/2019 | Pitre | G06F 8/65 |

OTHER PUBLICATIONS

Long Sun et al. "An Open IoT Framework Based on Microservices Architecture"; Networks & Security—China Communications • Feb. 2017.*

* cited by examiner

DYNAMIC AUTHORIZATION OF REQUESTED ACTIONS USING ADAPTIVE CONTEXT-BASED MATCHING

BACKGROUND

Software-based systems are increasingly dynamic in their functionality and communications behavior. In fields such as DevOps, continuation integration, source code control, and the Internet of Things (IoT), the content of software applications and code portions are rapidly changing, both before and during deployment. In some cases, the changes arise from software functionality that occurs automatically based on some detected system or environment condition, Examples include application-to-application communications or operations, load balancing applications automatically responding to changing network load conditions, cybersecurity threat detection systems automatically identifying and responding to potential attacks, connected vehicles automatically observing and adapting to changing road conditions, smart home appliances automatically predicting and remembering usage patterns, and many more. Using practices such as DevOps and continuous integration, software is rapidly being deployed into live environments, which may in turn result in the software affecting multiple different data centers or cloud providers across distinct systems and platforms.

Beneath this ever-changing outer appearance of software-based systems is often a multitude of applications or code segments. Many such systems use small software building blocks, such as micro services, that perform discrete functions in concert with each other to achieve an overall function or service. It is thus becoming uncommon for software-based systems to operate using a single, monolithic software application, or even a small number of such applications.

Because of the dynamically changing and complex nature of modern software-based systems, it is often difficult to know exactly what applications should be running, under what conditions, and what they should be permitted to do in a network. Existing attempts to add security to such environments add discrete controls to particular software flows or processes. For example, firewalls may attempt to limit network communications to known and permitted behavior, and whitelists for software functionality may attempt to limit code execution to known sequences (e.g., with code flow integrity approaches). This piecemeal approach is flawed and difficult to implement, however, because security vulnerabilities may exist at different layers of a software-based system and throughout many different application processes. The result is a few "security islands" without comprehensive security from the beginning of a process to its end or result state. Such approaches are constantly trying to identify and protect the weakest links in application processes, but do not succeed because of the complexity and dynamism of modern software deployments. Further, such techniques are inherently unable to protect against unknown or unappreciated portions of processes that may be security vulnerabilities. Because such gaps are unknown or unappreciated from a security standpoint, they go overlooked and thus unprotected.

Accordingly, in view of these and other deficiencies in existing techniques, technological solutions are needed for providing adaptive, customized, and flexible security in networks with dynamically changing software applications. Such techniques should be able to learn existing process flows in a network and adapt to detect the weakest links in such processes. By identifying the weakest link in a process, malicious or harmful activity may be detected so that the activity cannot continue through its associated process flow and harm a network or devices connected to the network. Further, such techniques should be able to continuously adjust in response to new learned process flows in the network. Through such techniques, various anomalies or threats in application processes may be identified, such as code injection, improper credential usage, irregular credential usage, new communication paths, new process flows, new user identities being involved, and more.

SUMMARY

The disclosed embodiments describe non-transitory computer readable media; systems, and methods for context-based analysis of requested activity in a computing environment. For example, in an exemplary embodiment; there may be a non-transitory computer readable medium including instructions that; when executed by at least one processor, cause the at least one processor to perform operations for context-based analysis of requested activity in a computing environment. The operations may comprise building a plurality of dynamic context profiles for a plurality of processes in the computing environment, wherein the plurality of dynamic context profiles are based on at least static parameters of the plurality of processes; dynamic parameters of the plurality of processes; and detected activity involving the plurality of processes; receiving an indication of current runtime activity involving at least one identity in the computing environment; matching the indication of current runtime activity to a dynamic context profile from the plurality of built dynamic context profiles, wherein the matching comprises analyzing previous steps of a process associated with the current runtime activity; and identifying, based on the previous steps, an automated action or a human action associated with at least one of the current runtime activity or the process; determining, based on the matching, a context-based probability that the current runtime activity is at least one of: an anomalous activity, a suspicious activity, or non-valid with respect to the dynamic context profile; and performing a control action in association with either the current runtime activity or the process based on whether the current runtime activity is determined to be at least one of: an anomalous activity, a suspicious activity, or non-valid.

According to a disclosed embodiment, receiving the indication of current runtime activity includes identifying a request from the at least one identity to perform an action in the computing environment.

According to a disclosed embodiment, the plurality of dynamic context profiles are based on detected activity in a DevOps environment.

According to a disclosed embodiment, the plurality of dynamic context profiles are based on detected activity requiring access across development and production environments.

According to a disclosed embodiment, the plurality of dynamic context profiles are based on detected activity in a cross-platform environment.

According to a disclosed embodiment, the plurality of dynamic context profiles are based on detected activity in a cloud computing environment.

According to a disclosed embodiment, the plurality of dynamic context profiles are based on detected creation of identities in a cloud computing environment.

According to a disclosed embodiment, the plurality of dynamic context profiles are based on detected use of applications in a cloud computing environment.

According to a disclosed embodiment, the plurality of dynamic context profiles are based on human interventions involving the plurality of processes.

According to a disclosed embodiment, the process is determined to be the weakest link among the plurality of processes through the matching.

According to a disclosed embodiment, the process is determined to involve automated processes requiring elevated privileges in order to access resources with no human involvement.

According to a disclosed embodiment, the process is determined to involve use of secrets or credentials of a human or an application.

According to a disclosed embodiment, the process is determined to be high-risk or associated with potential compromise or exploit.

According to a disclosed embodiment, matching the indication of current runtime activity to the dynamic context profile includes referencing a dependents-tree associated with the current runtime activity.

According to a disclosed embodiment, the operations further comprise updating a dynamic context profile from the plurality of dynamic context profiles based on the control action.

According to another disclosed embodiment, a method may be implemented for context-based analysis of requested activity in a computing environment. The method may comprise building a plurality of dynamic context profiles for a plurality of processes in the computing environment, wherein the plurality of dynamic context profiles are based on at least static parameters of the plurality of processes; dynamic parameters of the plurality of processes; and detected activity involving the plurality of processes; receiving an indication of current runtime activity involving at least one identity in the computing environment; matching the indication of current runtime activity to a dynamic context profile from the plurality of built dynamic context profiles, wherein the matching comprises analyzing previous steps of a process associated with the current runtime activity; and identifying, based on the previous steps; an automated action or a human action associated with at least one of the current runtime activity or the process; determining, based on the matching, a context-based probability that the current runtime activity is at least one of: an anomalous activity, a suspicious activity, or non-valid with respect to the dynamic context profile; and performing a control action in association with either the current runtime activity or the process based on whether the current runtime activity is determined to be at least one of: an anomalous activity, a suspicious activity, or non-valid.

According to another disclosed embodiment, the plurality of dynamic context profiles are built based on data from a plurality of independent data sources.

According to another disclosed embodiment, the context-based probability has an associated confidence level, and the confidence level is based at least in part on a number of steps in the dynamic context profile.

According to another disclosed embodiment, the plurality of dynamic context profiles are based on detected creation or activity of identities in the cloud computing environment.

According to another disclosed embodiment, the plurality of dynamic context profiles are based on detected use of applications in the cloud computing environment.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
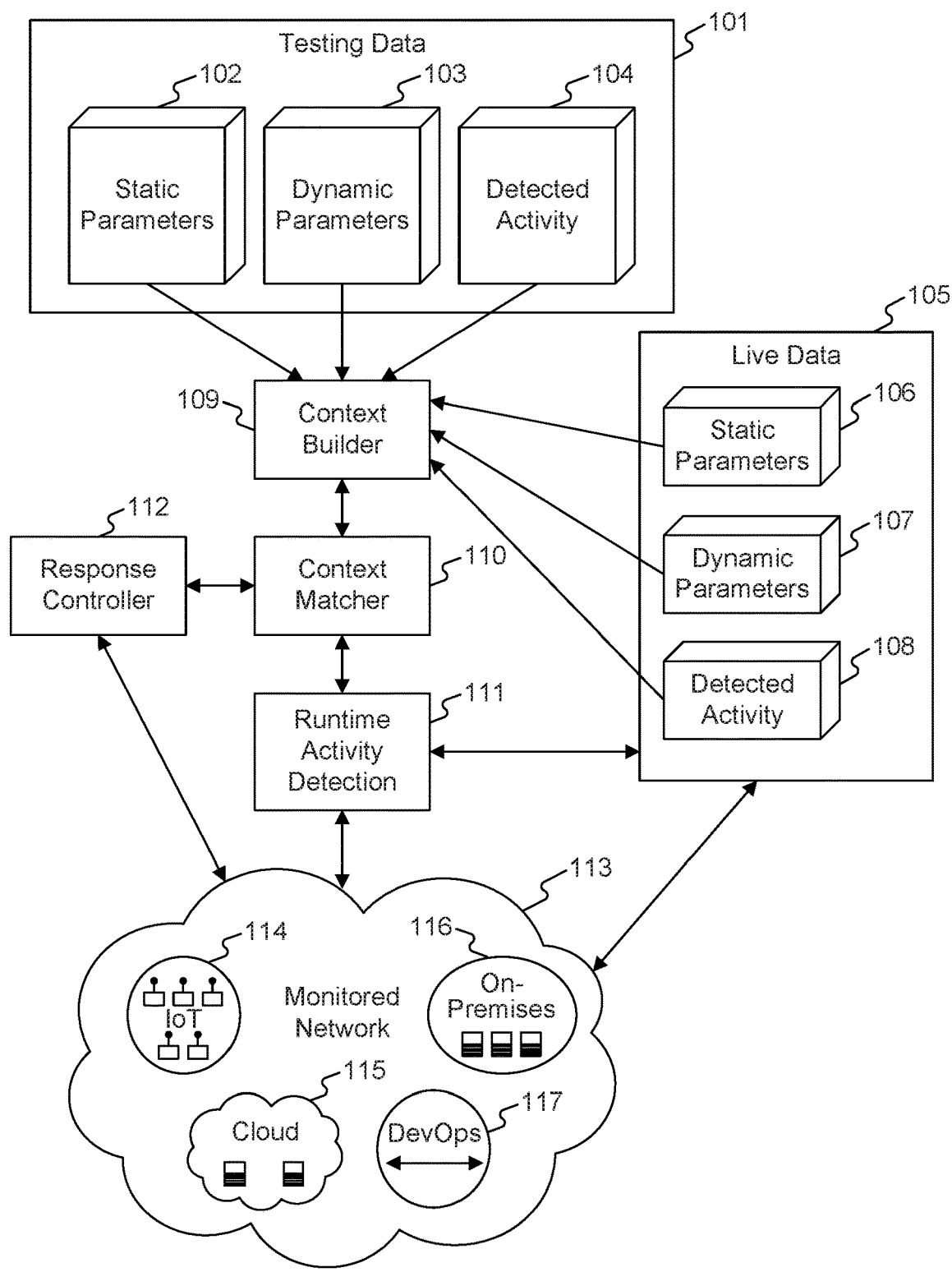
FIG. 1 is a block diagram of an example system for context-based analysis of requested activity in a computing environment in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of context-based analysis of requested activities described herein overcome several technological problems in the arts of cybersecurity and computer network-based communications. As discussed below, in networks of connected applications or devices (e.g., cloud-based networks, on-premises networks, IoT networks, etc.), discrete software processes may be observed from several perspectives. The processes' static parameters, dynamic parameters, and associated detected activity may all be monitored. Based on the monitoring and analysis, unique context profiles may be developed or defined for each process, capturing a sequence of operations from a beginning point to a resulting or ending point. When current runtime activity in the network is detected (e.g., a request from an application, a request from a user, an execution of an application, modifying or deleting a file, etc.), the activity may be compared with the context profiles and matched to determine whether it corresponds to a known context profile. Based on whether the current runtime activity exactly matches (or in some cases closely matches) a context profile, a determination may be made regarding whether to implement a control action for the current runtime activity or to permit the activity to occur. In some embodiments, the matching may occur midway through a particular process, and a control action may be implemented to prevent the process from continuing through an associated result state.

In contrast to prior security techniques, which attempted to secure (e.g., through firewalls, whitelists, code flow integrity, etc.) individual layers of a network-based system, or individual software functions, the techniques described herein may adaptively secure entire processes, from a starting point to a resulting or ending point. According to such techniques, even when a particular action or set of actions appears to be harmless in isolation, when compared to a context profile as discussed herein such actions may be classified as potentially malicious or suspicious. Further, unlike existing static security approaches, the techniques described herein are dynamic in nature, and are able to learn how processes in a network change, in order to thereby customize their security for such changing processes. Additionally, because the techniques described herein allow for learning the attributes of particular processes, they can be implemented without knowing a priori all of the attributes of a process. Such attributes can be learned and then used to form a context profile. In this manner, even when it is unknown what functions of a process are vulnerable, or what a particular process should look like in terms of its flow, the described techniques can learn and secure such processes.

Reference will now be made in detail to the disclosed embodiments, examples of which are illustrated in the accompanying drawings.

FIG. 1 is a block diagram of an example system 100 for context-based analysis of requested activity in a computing environment consistent with disclosed embodiments. As shown, system 100 includes a testing data environment 101 and a live data environment 105, each having one or more storage resources (e.g., databases or memory) storing static parameters 102/106, dynamic parameters 103/107, and detected activity 104/108. Testing data environment 101 may maintain actual historical data, artificial testing data, or simulated testing data, which may be useful in learning about processes and their attributes, as discussed further below. Live data environment 105, on the other hand, may be associated with an actual operational network environment (e.g., one of networks 113) where applications, devices, and/or users are communicating with each other. In some embodiments, testing data environment 101 may be designed to mimic live data environment 105, or may contain historical data coming from live data environment 105.

As an example, live data environment 105 may be associated with an operational DevOps environment (e.g., network 117), including many different applications or micro services being operated autonomously or through human direction. Testing data environment 101, in that example, may include historical data associated with processes running in live data environment 105. Static parameters 102/106 in such an example may include attributes of processes that do not change during the process.

Examples of static parameters 102/106 in a DevOps environment may include:
   user identities or accounts involved in creating software code secrets (e.g., passwords, keys, tokens, certificates, etc.) provided by such users to gain access to software code building systems (e.g., provided with Amazon Web Services™ Identity and Access Management, Microsoft Azure™ Secure DevOps, etc.)
   applications being used by such users to build code or engage with the DevOps pipeline (e.g., Amazon Web Services™ Command Line Interface, Amazon Web Services™ CodePipeline, Amazon Web Services™ CodeBuild, Microsoft Azure™ Pipelines, etc.)
   applications being used by the user to deploy software code (e.g., Amazon Web Services™ CodeDeploy, Amazon Web Services™ CodeStar, Microsoft Azure™ Artifacts, etc.)
   software code language
   network address information (e.g., IP address, MAC address, etc.) associated with such users
   privileges, permissions, or rights of such users in a network Examples of dynamic parameters 103/107 in a DevOps environment may include:
   time or date
   weather or other environmental parameters
   geographic or relative spatial location of a user
   additional applications being utilized by the application or user
   additional network connections being requested or received by the application or user
   content of software code being created or updated by the application or user
   type of file being transmitted or received by the application or user
   size of file being transmitted or received by the application or user
   state or status (e.g., in-use v. passive, transmitting v. receiving, capturing v. not capturing, moving v. stationary, warm v. cool, etc.)

Examples of detected activity parameters 104/108 in a DevOps environment may include:
   logging into a network operating system (e.g., Windows™, Linux, etc.)
   accessing particular applications in a network environment (e.g., on-premises network, cloud-based network, etc.)
   accessing source code that is subject to modification
   displaying an NFC (e.g., RFD) key fob
   interacting with a GUI display
   creating, modifying, or deleting data or files In view of the above, it may be seen that some parameters may be changing during a particular process (and hence be considered dynamic parameters), while the same parameters may be unchanging during another process (and hence be considered static parameters). For example, if the geographic location of a user or application changes during a process of a user moving from a parking garage to a building entry point, that may be considered a dynamic parameter. On the other hand, the geographic location of a user or application may remain fixed during a DevOps or source code upload process, and in such a situation geographic location may be considered a static parameter. As another example, while the weather or environmental conditions may be considered a static parameter in a process of updating software on a vehicle, they may be considered a dynamic parameter during a process of detection motion by a surveillance camera in uploading video content to a server. In some embodiments, only one of testing data environment 101 or live data environment 105 may be used, while in other embodiments both environments may be used.

It should also be noted that testing data environment 101 and live data environment 105 may each involve combinations of data sources. In particular, the static parameters 102/106, dynamic parameters 103/107, and detected activity 104/108 may originate from a wide range of sources such as user-facing applications, hidden or transparent applications, operating systems, firewall or gateway devices, cloud-computing activity logs (e.g., AWS™ CloudTrail, Azure™ Activity Log, etc.), network directory information (e.g., Active Directory™), employee or human resources directory information, sensors (e.g., biometric, heat, temperature, light, proximity, humidity, smoke, etc.), RFID or other NFC transceivers, time and date sources, weather reports, video-captured data (e.g., license plate recognition data, facial recognition data, etc.), and more.

The testing data 101 and/or live data 105 may come from actual network operations, such as those of networks 113. One example is an IoT network 114, which may be various types of networks, such as networks of sensor arrays, smart home appliances, connected vehicles, home automation devices, video surveillance equipment, smart agriculture devices, connected stoplights or road signs, and more. Cloud-based network 115 may be various types of cloud networks (e.g., based on infrastructure from Amazon Web Services™, Microsoft Azure™, IBM Cloud™, etc.), and may be private in nature, public, or a hybrid of public and private in nature. Such a cloud-based network 115 may operate many different virtual machines, Docker™ containers, serverless code instances, or other forms of cloud-based computing resources, and may take the form of a platform as a service (PARS) network, software as a service (SAAS) network, infrastructure as a service (IAAS) network, or other forms of networks. An on-premises network 116 may include personal computing workstations, laptops, wireless computing devices, printers, IP telephones, surveillance systems, building entry devices, lighting automation devices, or other types of network-connected devices. Such an on-premises network 116 may be configured to communicate across various types of network protocols, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, a private data network, a virtual private network using a public network, a nearfield communications technique (e.g., Bluetooth, infrared, etc.), or various other types of network communications. In some embodiments, the communications may take place across two or more of these forms of networks and protocols. A DevOps network 117 may include applications or systems devoted to product requirements, bug testing, user interface testing, code review, code building, artifact or golden image storage, deployment tools, validation or security tools, performance monitoring tools, and more. Such a DevOps network 117 may be based on software such as Puppet™, Chef™, Jenkins™, Azure DevOps™, Docker™, Kubernetes™, Elastic Beanstalk™, or various others.

In some embodiments, networks 113 may operate on a cross-platform basis, or such that network activity in one of networks 113 occurs in multiple of such networks 113. As an example, a process of providing an over-the-air software update to a vehicle may involve an IoT network 114 (including the vehicle) and a cloud-based network 115 (including a virtualized server providing the update). Similarly, a process of entry into a building may involve an IoT network 114 (e.g., including surveillance cameras, access point devices, etc.) and an on-premises network 116 (e.g., including human resources databases, employee ID records, etc.).

System 100 also includes applications including a context builder 109, context matcher 110, runtime activity detection 111, and response controller 112. As discussed below, in some embodiments of system 100, context builder 109 may be configured to analyze the data from the testing data environment 101 and/or live data environment 105 and build unique context profiles for individual software-based processes (e.g., DevOps processes, continuous integration processes, network connectivity processes; IoT processes, etc.). For example, context builder 109 may look for patterns of known, valid activity (or known, invalid activity) and define the steps in each process as part of each context profile. When runtime activity detection 111 observes new activity in a network (e.g., a request by an application or user, an action by an application or device, etc.), the observed activity may be compared to the context profiles by context matcher 110 to determine whether the observed activity exactly fits (or closely fits) a particular context profile. Based on the matching process, response controller 112 may determine whether to not to apply a control action to the detected runtime activity and; if so, what control action to perform (e.g., blocking the activity, requiring another security prompt to the user, requiring a security prompt to an administrator, monitoring the activity, logging the activity, generating an alert, etc.). Such control actions are discussed further below in connection with FIG. 7.

In system 100, context builder 109 may be configured to gather process information from testing data environment 101, from live data environment 105, or both. In some embodiments, testing data environment 101 may include historical data from live data environment 105, or may contain sets of learning data that context builder 109 may use to develop context profiles for individual processes. Context builder 109 may analyze the process information to identify patterns and complete process flows, from beginning points to result points, where the beginning points are associated with human actions that begin the processes.

As an example, context builder 109 may obtain process information from testing data environment 101 and/or live data environment 105 relating to a process for uploading source code into a control repository. Through observing patterns of users uploading source code, context builder 109 may determine that a common or repeated pattern is as follows: user logs into a network from a particular IP address using a particular machine during certain working hours→user opens a software development application (e.g., Atom™, AWS Cloud9™, GitHub™, etc.)→user accesses code from a source code repository corresponding to their team role or department→user makes edits to less than a threshold portion of the overall code (e.g., less than 5%) or makes edits to portions of code that change frequently as opposed to portions that remain unchanged over time→user does not alter fundamental attributes of the source code (e.g., programming language, libraries, IP addresses or ports referenced by the code, etc.)→user attempts to upload the edited code from the same particular IP address using the same particular machine during the same certain working hours into a code version control system (e.g., Git™, AWS CodeCommit™, Helix Core™, Microsoft Team Foundation Server™, etc.) that contains an existing version of the code. When context builder 109 determines that this is a process flow that occurs regularly (e.g., a threshold number of times exactly, a threshold number of times within an acceptable margin of error, a certain percentage of the time, etc.), it may define the process flow as a context profile. In some embodiments, context builder 109 may further determine whether the context profile is, or is not, associated with potential security vulnerabilities (e.g., whether the process is known to be safe and acceptable, or potentially unsafe, malicious, or insecure).

As another example, context builder 109 may obtain process information from testing data environment 101 and/or live data environment 105 relating to a process for scheduling a software update in a network-connected vehicle. Through its analysis of the process flow data available to it, context builder 109 may determine that a regular process flow is as follows: a user unlocks their vehicle using a key fob the user is presented with a visual display of a new software update to be installed→the user selects a particular day and time for the software update to be installed→on the selected day and time of the software update, the vehicle is in an idle state and has a known and trusted WiFi connection with a router associated with the user→the software update is performed while the vehicle is in the idle state and using the known and trusted WiFi connection→the software update is of a known and approved file format and is within an acceptable file size limit (e.g., <50 MB)→the software update affects infotainment or user enjoyment features of the vehicle but not core driving features of the vehicle (e.g., braking, steering, acceleration, etc.). As with the above example, a further check may be performed to determine whether, or whether not, the process identified by the context builder 109 is known to be safe or unsafe.

As a further example, context builder 109 may obtain process information from testing data environment 101 and/or live data environment 105 relating to a process for transmitting video from a security camera. In this situation, context builder 109 may determine that a regular process flow involves: an onboard motion detection sensor in the camera detects motion→an integrated application within the camera begins to record video content having a known and approved file format and file size (e.g., <500 MB)→the camera attempts to send the recorded video from the camera's IP address to a known and approved IP address of a server within a certain threshold period of time after the motion was detected (e.g., <30 seconds). Similar to the above examples, a further check may be performed to determine whether, or whether not, the process identified by the context builder 109 is known to be safe or unsafe.

In some embodiments, when context builder 109 develops context profiles for discrete processes, it may store them in a database. For example, each process may be stored with a reference or identifier (e.g., file name, keyword, numerical identifier, hash, category, pointer, etc.). Further, the context profiles may be dynamic in nature and may be updated periodically or continuously. As additional process flow data is made available from testing data environment 101 and/or live data environment 105, context builder 109 may develop new context profile definitions or may refine existing context profile definitions that it has already developed. For example, in the above illustrations if a user begins to use a new IP address or a new application, or changes a job function to work on a new portion of source code, a new process flow may be developed or a refinement to an existing process flow may be created. In this way, the process flow information from testing data environment 101 and/or live data environment 105 may continuously or periodically (e.g., every hour, day, etc.) be fed into context builder 109 to develop new context profiles or update existing context profiles. The context profiles maintained by context builder 109 can thus be dynamic in nature and adapt to changes in processes occurring in the network environment.

Context builder 109 may, in some embodiments, categorize or group developed context profiles for the purpose of applying a particular context profile to one or more other users, identities, applications, or devices in the group. For example, in an embodiment involving multiple network security cameras, each being deployed to perform the same function (e.g., detect motion and transmit captured video) but in different locations, once a context profile is identified for one camera it may be applied to other cameras in the same group. Similarly, once a context profile of a driver of a vehicle scheduling a software update is confirmed, the same context profile may be applied to other vehicles and other drivers. In situations like these where a context profile is "borrowed" and applied to other users, identities, applications, or devices in a group, it may be updated and customized as discussed above. Accordingly, even though two users, identities, applications, or devices may initially share the same context profile, if they are detected to operate differently then those differences may be captured and reflected in different context profiles for each of them.

Runtime activity detection 111 may be configured to monitor activity occurring in live data environment 105. This may occur in several ways. For example, runtime activity detection 111 may be implemented as a proxy server physically separate from the live data environment 105, or a proxy agent integrated into one or more applications within live data environment 105. Further, runtime activity detection 111 may be integrated into a network gateway or firewall device within live data environment 105. Regardless of where runtime activity detection 111 is situated, it may be configured to send some or all information regarding network activity to context matcher 110. For example, in some embodiments, runtime activity detection 111 may forward all activity information (e.g., applications opened, credentials provided, communications requested, data stored or modified, data deleted, time and date information, environmental information, etc.) to context matcher 110. In other embodiments, runtime activity detection 111 is configured to send only some runtime activity from live data environment 105 to context matcher 110. For example, runtime activity detection 111 may be configured to monitor only activity involving a particular application, a particular IP address, a particular physical access point to a building, a particular user, a particular type of communication, a particular file type, etc. In such a situation, runtime activity detection 111 may ignore all detected activity from live data environment 105 except activity of a type being monitored.

Context matcher 110 compares elements of developed context profiles from context builder 109 with elements of detected runtime activity from runtime activity detection 111. In some embodiments, context matcher 110 looks for an exact match between the process steps of detected runtime activity and a context profile, both in terms of the steps performed and their sequence. In other embodiments, context matcher 110 applies computational techniques to determine the degree to which process steps of detected runtime activity match a context profile. For example, in some embodiments, each of the steps of a context may be given numerical (absolute or relative) weights. When current runtime activity is compared with the context, a numerical score may be computed based on the matching between the current runtime activity and the process steps of the context. In some embodiments, additional weights may be applied to the extent steps from current runtime activity match the same sequence of steps as those in the context profile. Further, a context profile may be expressed as a dependents tree, and the runtime activity may be matched to the dependents tree. In other embodiments, statistical techniques are used to determine the degree of matching between current runtime and context profiles. For example, the context profile may be expressed as a model, and a best fit statistical analysis (e.g., least square method, goodness of fit, etc.) may be performed to determine the particular context profile that most closely matches the observed runtime activity. Further, such techniques may be used to compute the degree of deviation between the particular context profile and the observed runtime activity. According to such statistical or modeling techniques, it may be easier to detect that a particular action matches a context profile when the context profile includes more constituent steps. In other words, if there are more steps in the context profile to be matched, there may be more points to result in matches, which will yield a higher probability or reliability of a conclusion that detected activity matches a context profile.

In some embodiments, the matching may produce a numerical score, or a probability, that the observed runtime activity matches a particular context profile. For example, given information that a detected runtime activity has performed some of the steps corresponding to a context profile, a probability may be computed expressing how likely it is that the runtime activity will complete the process of the context profile. Alternatively, the probability may express a likelihood that detected runtime activity corresponds to a particular context profile. As discussed above, the score or probability may also have an associated confidence or error level. In some embodiments, the confidence may be increased (and error decreased) when there are more points in the context profile to be matched. Further, in some embodiments the confidence or error may be improved where certain statistically significant steps in the process (e.g., the first two steps, first three steps, etc.) or branches of a dependents tree for the context profile are met in the correct sequence by detected activity.

Based on context matcher 110 determining a match between observed runtime activity and a context profile (e.g., an exact match, a degree of matching, or a probability of matching), context matcher 110 may output its matching results to response controller 112. Response controller 112 may be configured to determine whether the matching results warrant any control action and, if so, what control action to perform with respect to a user, application, or device in one of networks 113. For example, response controller 112 may be configured to require only exact matches in order for a control action to be performed. Alternatively, response controller 112 may require at least a threshold level of matching, or threshold probability of matching, before a control action will be performed. In other embodiments, the degree or probability of matching may determine what particular control action to perform. For example, a lower probability may result in only monitoring or logging the detected activity, while a higher probability may result in blocking the activity.

Control actions may take several forms. For example, as discussed in connection with FIG. 7, a control action may involve controlling activity associated with a user, identity, access point, device, etc. In situations where there is a match between detected runtime activity and a context profile, and if the context profile is known to be valid and safe, the control action may include permitting the runtime activity to occur or to continue (e.g., continue to reach its result state). On the other hand, upon a mismatch or lack of a sufficient match, the control action may involve blocking or stopping the runtime activity (e.g., blocking a communication, disabling a user's machine, revoking credentials of the user, terminating an application, etc.). Other types of control actions may include requiring the user or application to authenticate itself before it may continue with the runtime activity. This may involve two-factor authentication, out-of-band authentication, or requests for external (e.g., administrator) approval. In other embodiments, the control actions may include modifying permissions (e.g., privilege levels, privileged group memberships, etc.) associated with a user or application. Other types of control actions may include generating alerts (e.g., system prompts, e ails, SMS messages, etc.), triggering a process of monitoring user or application activity, or logging activity of the user or application. Various other types of control actions for responding to or addressing detected runtime activity are possible as well.

Figure 2:
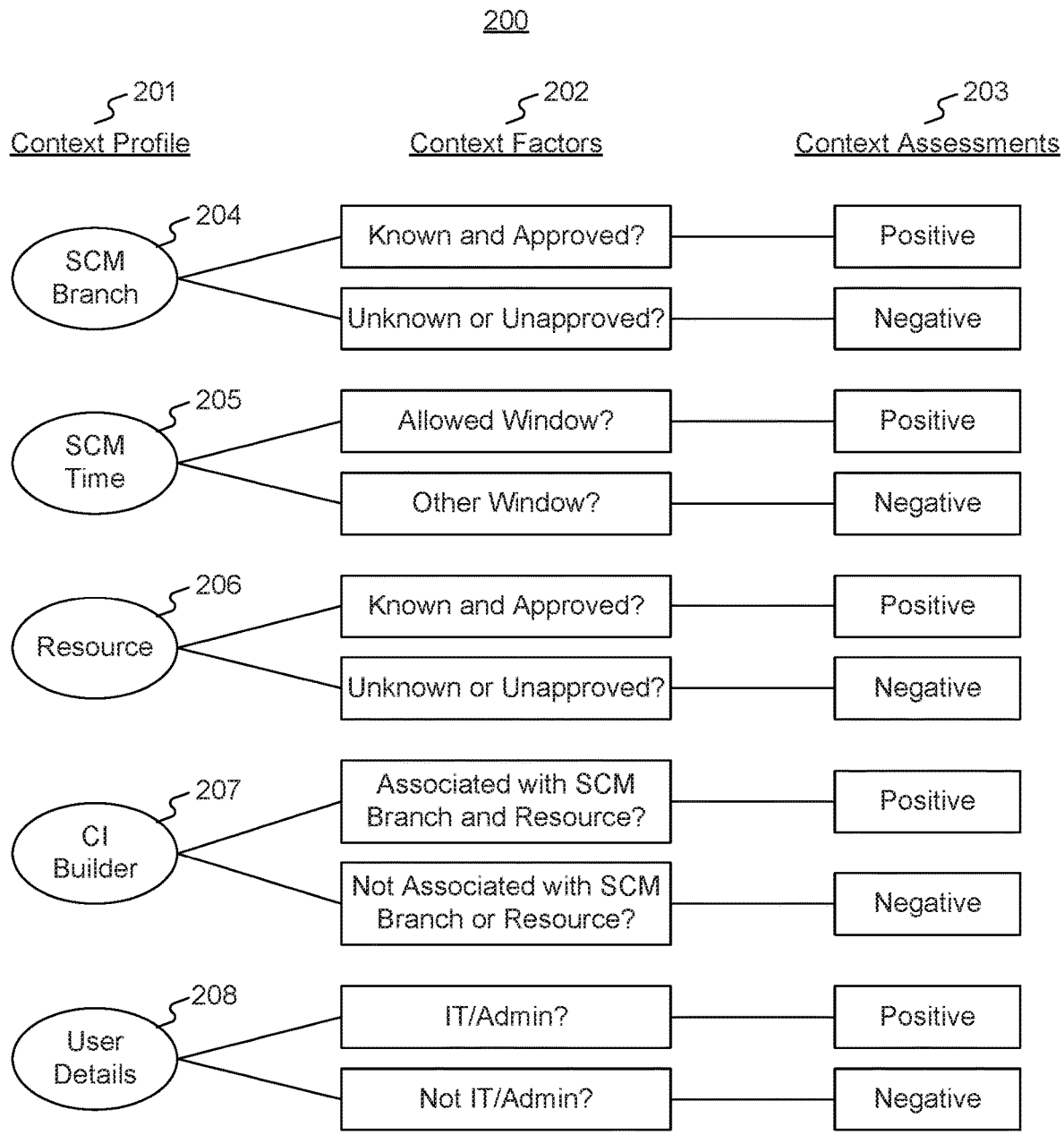
FIG. 2 is an example illustration of a context profile and context assessment for a DevOps process in accordance with disclosed embodiments.

FIG. 2 is an example illustration 200 of a context profile 201 having multiple factors 202, which may be used in a context assessment 203 for a DevOps process. As discussed above, a DevOps process may be based on tools such as Puppet™, Chef™, Jenkins™, Azure DevOps™, Docker Kubernetes™, Elastic Beanstalk™, or various others. Based on the techniques discussed above with reference to FIG. 1, a context matcher 110 may receive information regarding the operation of DevOps processes from testing data environment 101 and/or live data environment 105 (e.g., coming from an actual DevOps network 117), and may determine context profiles for individual processes.

As illustrated in FIG. 2, a particular context profile 201 may involve a user accessing a particular software control management (SCM) branch 204 (e.g., a particular code line, stream, or tree) in a source code development system. The context profile 201 may also include a particular SCM time (e.g., time when the SCM branch 204 was accessed or created). Further, the context profile 201 may include a particular resource 206 identifier, such as the identifier of a resource that is the subject of the source code development, a resource being used by the user to build the source code, a resource storing the source code, etc. Additionally, context profile 201 may include a continuous integration (CI) builder 207. As noted above, CI software building tools may include, for example, Bamboo™, GitLab™, Jenkins™, Vexor™, and others. Further, context profile 201 may include user details (e.g., user ID information, account information, employee identifiers, etc.) associated with the user performing the actions in the source code development system.

Each of the steps or attributes 204-208 of context profile 201 may have corresponding factors 202, which may be used in determining whether (or to what extent) observed runtime activity matches particular attributes of the context profile 201. For example, as shown in FIG. 2, each of context factors 202 may indicate whether observed runtime activity follows the context profile 201 in sequence and also in actions. For each context factor 202, a corresponding context assessment 203 may indicate whether the factor 202 is positive or negative (e.g., consistent with a flow or not). In the example of FIG. 2, an exact match with a context flow may exist where the SCM branch 204 is known and approved, the SCM time 205 is within an allowed time window (e.g., working hours), the resource 206 is known and approved, the CI builder 207 is associated with the SCM branch 204 or resource 206, and the user details 208 are those of an IT or administrator identity. Each factor may be deemed "positive" in that situation in a context assessment 203. Alternatively, if there is less than an exact match between the observed context factors 202 and the context profile 201, a computation may be made identifying the degree of match (or deviation) or the probability of a match (or deviation), as discussed above. Further, as discussed above, different context factors may be given different weights so that they are weighed more or less in the computed degree of match or probability of match. Based on this computed degree of match or probability of match, a control action may be applied as discussed further below in connection with FIG. 7 (e.g., removing privileges associated with the user, requesting that the user supply additional authentication information, denying the user's requested changes to the code, etc.). As also discussed above, in some situations the detected activity may correspond to a portion of the context profile 201 (e.g., the first three context factors). In such a situation, if the detected activity is matched to the context profile 201 sufficiently, the detected activity may be subjected to a control action at that point, potentially without even reaching the remaining two steps in the context profile 201.

Figure 3:
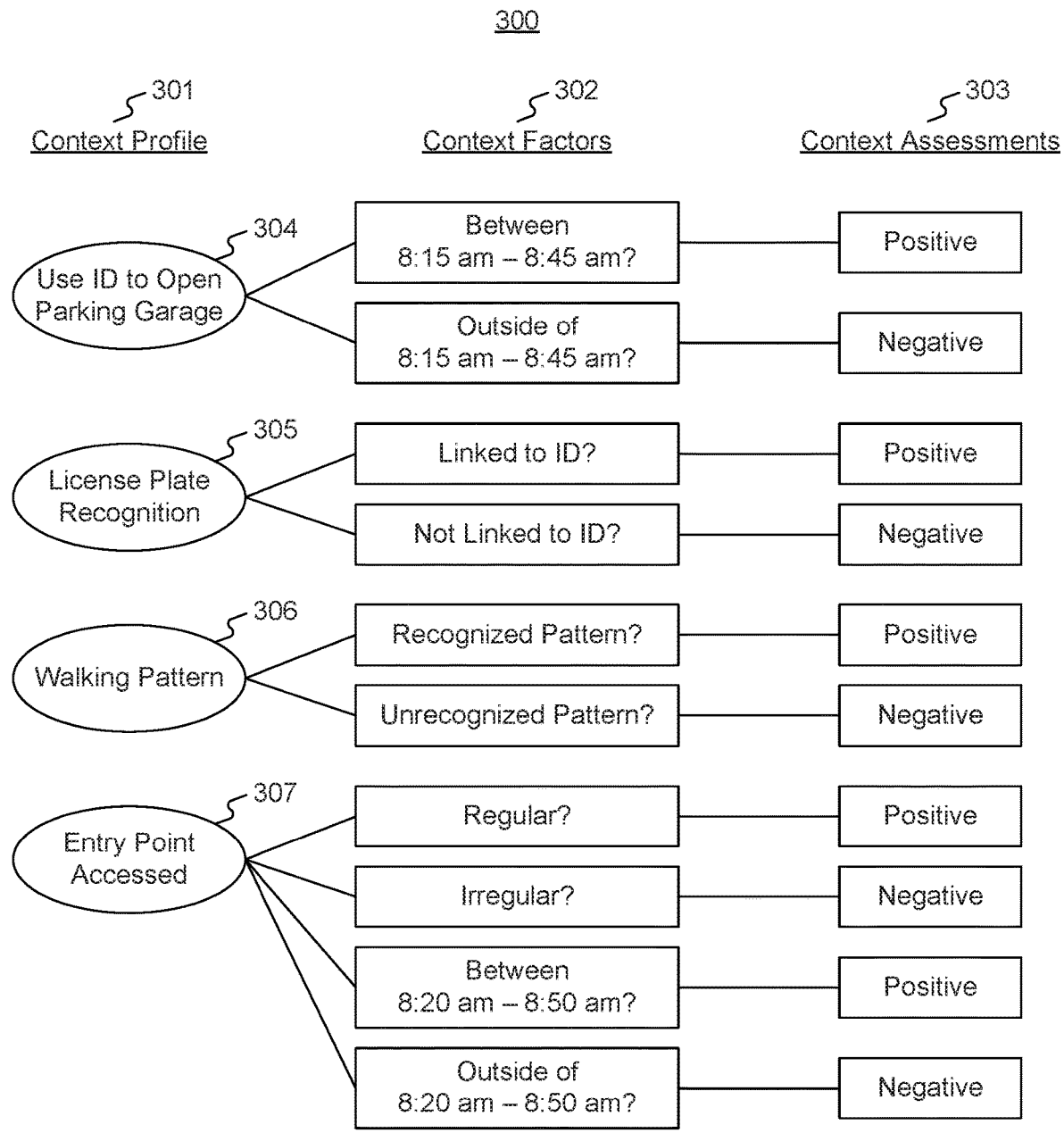
FIG. 3 is an example illustration of a context profile and context assessment for a physical access point verification process in accordance with disclosed embodiments.

FIG. 3 is an example illustration 300 of a context profile 301 having multiple factors 302, which may be used in a context assessment 303 for a secure building entry process. This process may occur, for example, in an IoT network 114, cloud network 115, or on-premises network 116, as discussed above regarding FIG. 1.

In the example illustrated in FIG. 3, an employee may be arriving at an office location, entering a parking garage, and attempting to access the office through a particular secured door. According to this process, with reference to FIG. 1, context matcher 110 may receive information regarding historical and/or live processes involving employees attempting to access the office. Such data may be fed to context matcher 110 from testing data environment 101 and/or live data environment 105, and may be analyzed to define context profiles for individual processes (e.g., individual employees).

In context profile 301, the employee may arrive at a parking garage and use their employee ID (e.g., RFIC or other NFC card) to open the parking garage entrance in step 304. Context factors 302 may identify particular time windows when this happens according to the context profile 301. Step 305 may involve license plate recognition, which may be performed by a network-connected video surveillance camera with onboard or external video analytics software that is capable of reading license plates. Context factors 302 may determine, such as by cross-referencing an employee or human resources database, whether the license plate corresponds to the employee. Step 306 may analyze a walking pattern of the employee from the parking garage to the building entry point (e.g., by monitoring a wireless signal from a personal computing device of the employee, visually tracking the employee using network-connected video cameras, or by simply determining whether the employee arrives at the building entry point within a determined time interval of having entered the parking garage). Step 307 may determine the particular building access point that the employee attempts to access, and context factors 302 may determine whether the access point is part of the context profile and whether the employee accesses the entry point within a determined time interval.

According to the process of FIG. 3, an exact match between observed activity and the context profile 301 may occur where the employee uses their ID to enter the parking garage between 8:15 am-8:45 am, their license plate is determined to be linked to their employee ID, they exhibit a recognized walking pattern or time to move from the garage to the building access point, and attempt to access a regular building access point within 8:20 am-8:50 am. If the employee does not follow context profile 301 exactly, or if another employee is determined to be following context profile 301, the deviation between that observed activity and context profile 301 may be expressed as a degree of match (or deviation) or probability of match (or deviation). This may then be used to determine whether to apply a control action, as discussed in connection with FIG. 7 (e.g., denying entry to the building, generating an alert, etc.).

Figure 4:
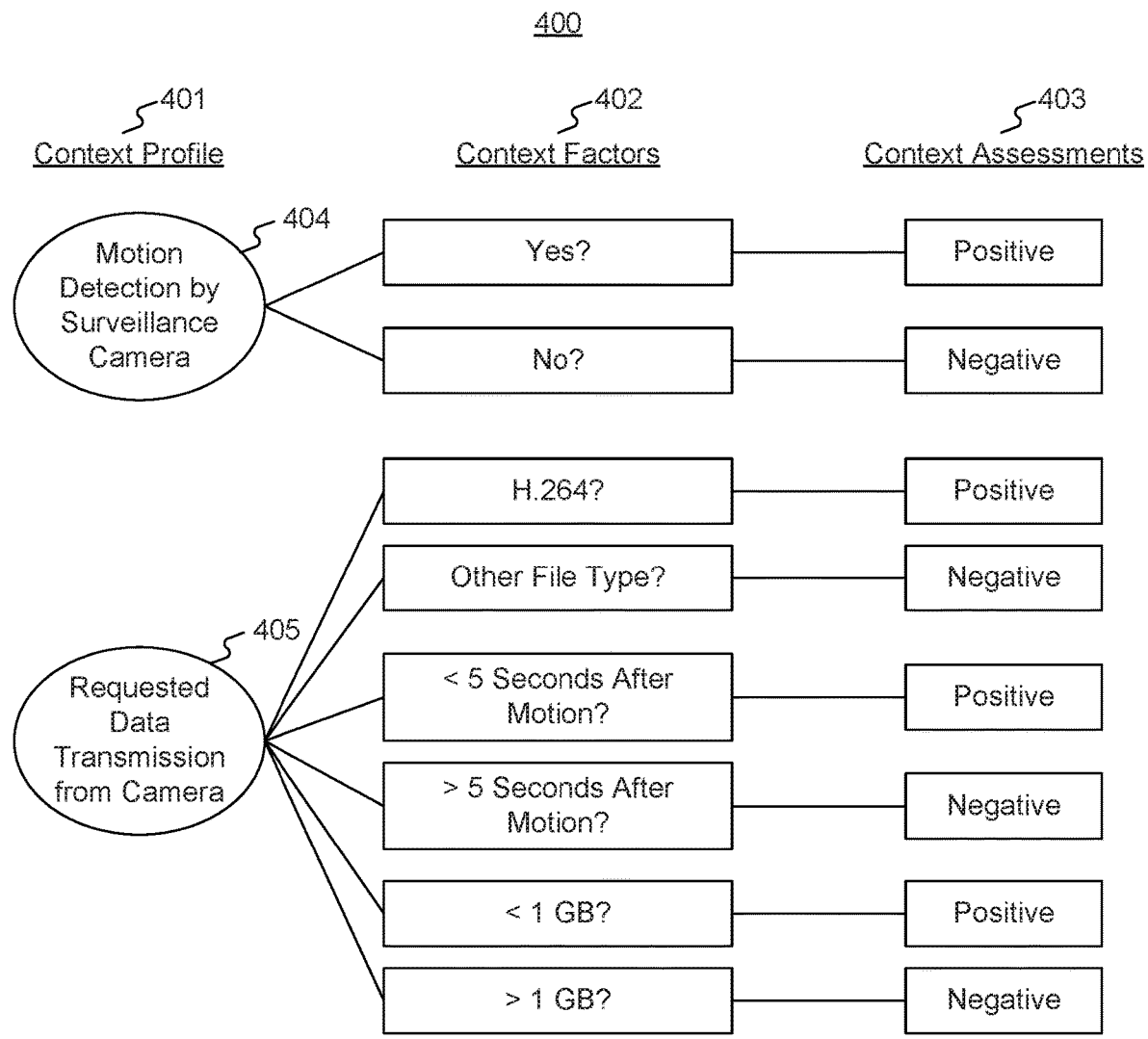
FIG. 4 is an example illustration of a context profile and context assessment for a network camera data transmission process in accordance with disclosed embodiments

FIG. 4 is an exemplary illustration 400 of a context profile 401 having multiple factors 402, which may be used in a context assessment 403 for a network camera data transmission process. This process may occur, for example, in an IoT network 114, cloud network 115, or on-premises network 116, as discussed above regarding FIG. 1.

According to the context profile 401 of FIG. 4, a network-connected surveillance camera may be situated in or outside of a building. The camera may have onboard motion detection software configured to detect changes between image frames and determine whether a sufficient amount of motion has occurred for there to be a prompt to begin recording or transmitting video to a remote server. For example, the camera may record several seconds of video before and after the detected motion, and transmit the video to a designated video recorder server.

In step 404, the camera's onboard motion detection software may detect motion between image frames. Context factors 402 may make this determination. Step 405 may involve the camera requesting to transmit video data of a certain file size and a particular format to a remote server within a certain time interval after motion was detected. Context factors 402 may assess whether detected runtime activity matches this profile 401 as well.

An exact match to context profile 401 may exist where observed activity involves the camera's onboard motion detection software detecting motion, and sending video content of less than 1 GB using the H.264 standard to a particular server within five seconds of the motion detection event. If the observed activity does not match this process exactly, the degree of match (or deviation) or probability of match (or deviation) may be computed. As discussed below in connection with FIG. 7, this output may be used to select among potential different control actions (e.g., blocking the video transmission, removing privileges associated with the video camera identity in a network, disabling the camera, etc.).

Figure 5:
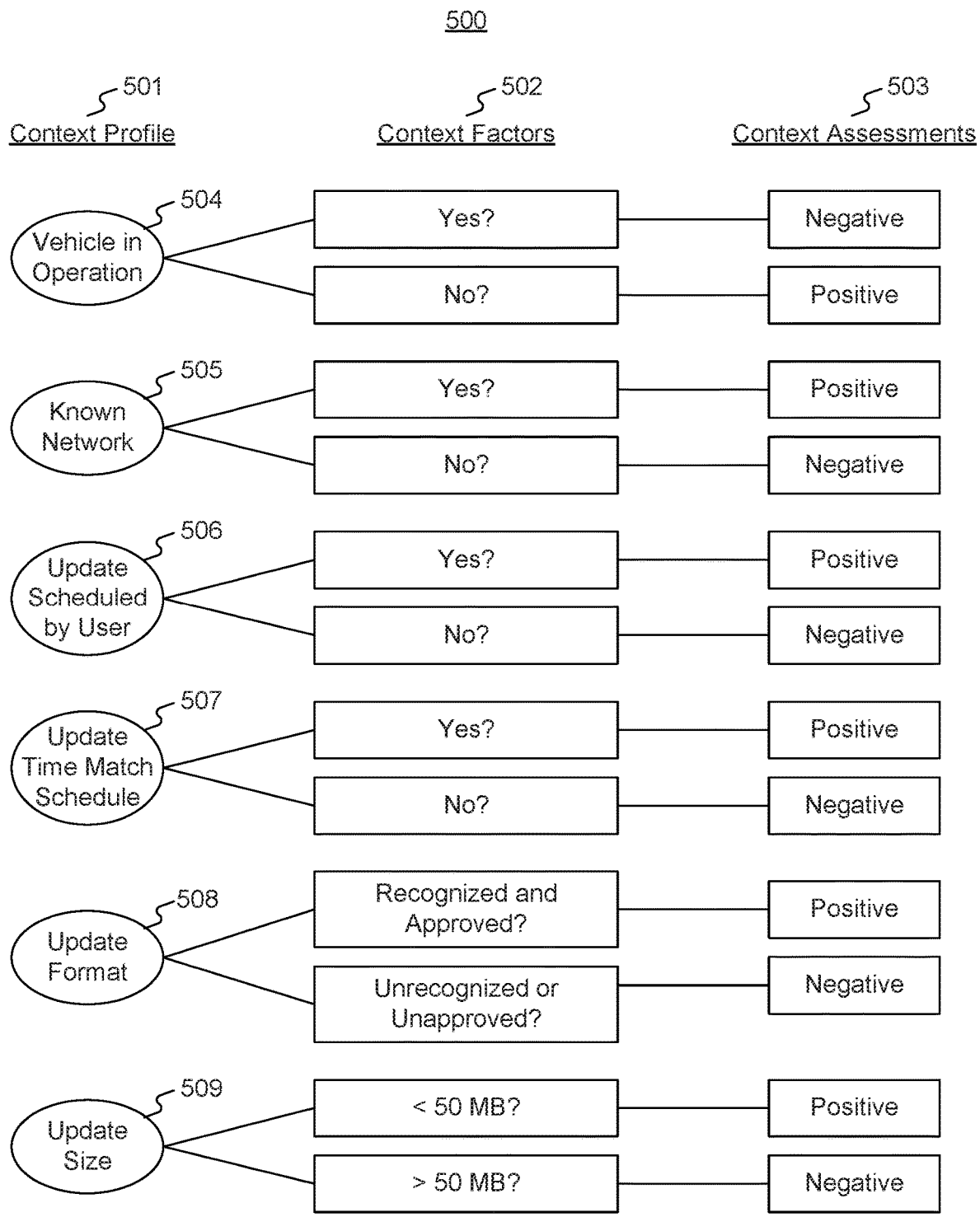
FIG. 5 is an example illustration of a context profile and context assessment for a vehicle software update process in accordance with disclosed embodiments.

FIG. 5 is an exemplary illustration 500 of a context profile 501 having multiple factors 502, which may be used in a context assessment 503 for a process of updating software on a network-connected vehicle. Because the vehicle may be considered an IoT device, this process may occur in an IoT network 114 as discussed above regarding FIG. 1.

Context profile 501 may be developed to include steps of delivering a software update file to the vehicle over a WiFi connection associated with the home network of the driver of the vehicle, where the update is scheduled to occur during a predetermined time when the vehicle will be stationary and idle. With reference to FIG. 1, context matcher 110 may receive information regarding historical and/or live processes of the user of the vehicle (or other users of vehicles) performing over-the-air software updates, and build context profile 501.

Context profile 501 may involve determining in step 504 whether the vehicle is stationary/idle or in use. Step 505 may determine whether the vehicle has an active connection (e.g., WiFi) with the driver's home network. Step 506 may confirm whether the particular software had been scheduled by the user to occur at a particular time, and step 507 may determine whether the attempted update is occurring at the scheduled time. In step 508, context profile 501 may check whether the file format of the software update matches an approved and recognized format. Finally, step 509 may determine whether the software update file is under a threshold file size.

When detected activity (e.g., an attempted software update for the vehicle) is detected, its associated process steps may be compared to the context factors 502 of the context profile 501 to form context assessments 503. The exactness of the match, or degree or probability of the match, may then be determined and used to determine whether a control action should be taken. As discussed in connection with FIG. 7, control actions may include blocking the software update, quarantining the software update, generating an alert, etc.

Figure 6:
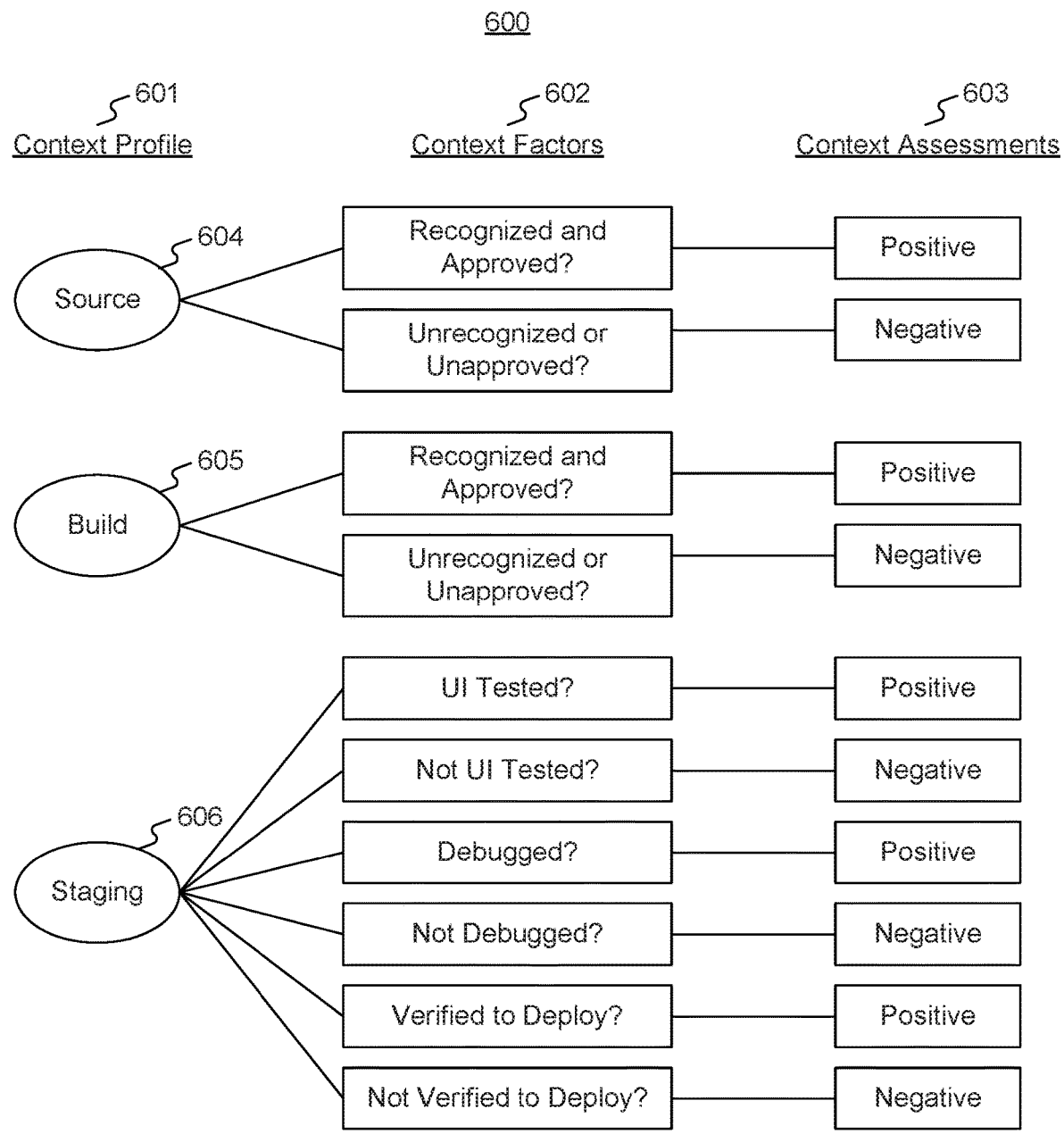
FIG. 6 is an example illustration of a context profile and context assessment for a source code deployment process in accordance with disclosed embodiments.

FIG. 6 is an exemplary illustration 600 of a context profile 601 having multiple factors 602, which may be used in a context assessment 603 for a process of building and deploying software according to a continuous integration process. This process may occur, for example, in a cloud network 115, on-premises network 116, or DevOps network 117, as discussed in connection with FIG. 1.

Context profile 601 may be to include steps of determining the source 604 (e.g., user or application) updating source code in a continuous integration system, the build tool 605 being used by the source, and the staging process 606 for the source code. With reference to FIG. 1, context matcher 110 may receive information regarding historical and/or live processes in the continuous integration environment, and build context profile 601.

According to context profile 601, context factors 602 may determine whether the source 604 of source code updates is known and approved (e.g., has authenticated itself to the system, is part of a group membership having privileges to modify the source code, etc.). Context factors 602 may also determine whether the source code building application 605 is recognized and approved. For example, this may involve determining whether the user is accessing a code development program (e.g., Bamboo™, GitLab™, Jenkins™, Vexor™, etc.) that they are permitted to access, or that they are permitted to use with respect to the particular source code they are editing. Context factors 602 for the staging step 606 may determine whether the source code has been user interface (UI) tested, has been debugged, and has been verified to deploy into production. Context assessments 603 may consider each of context factors 602, and determine whether observed activity from a continuous integration environment matches the context profile 601. If there is an exact match, and if the context profile 601 is determined to be safe and permitted, the observed activity may be permitted. On the other hand, if the match is partial, the degree or probability of match may be used to determine whether to apply a control action and what control action to apply. As discussed in connection with FIG. 7, control actions may include disabling the user's account, blocking their edits to the source code from being stored, blocking the edited source code from being deployed, etc.

Figure 7:
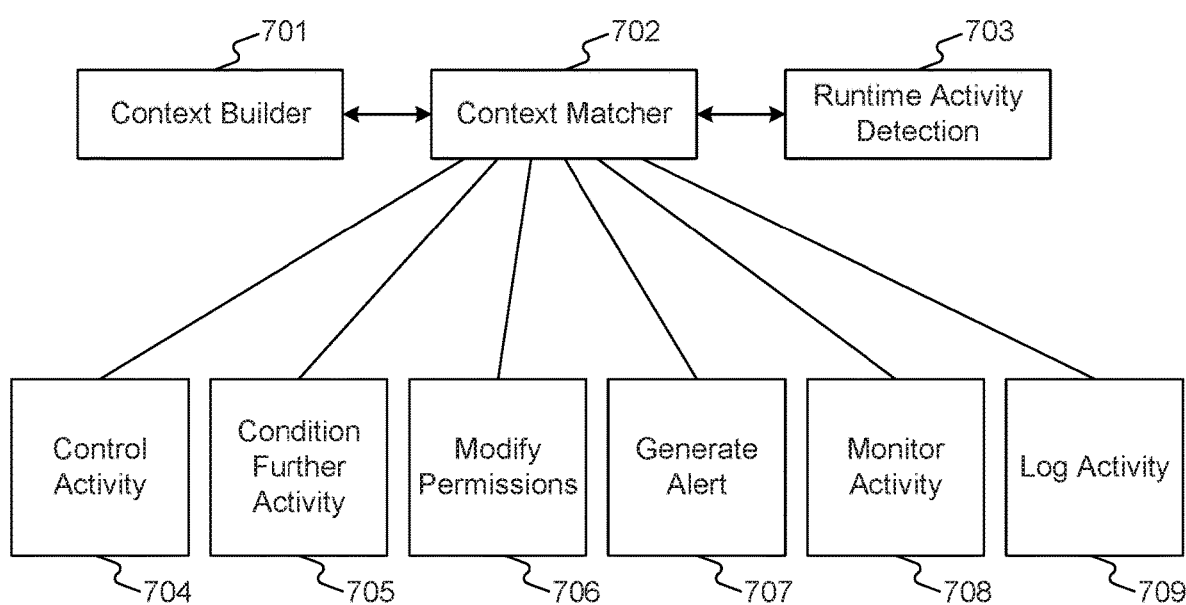
FIG. 7 is a block diagram of an example system for identifying and implementing control actions based on context matching in accordance with disclosed embodiments.

Various potential control actions are illustrated in system 700 of FIG. 7. Consistent with the discussion of system 100 above, context builder 701, context matcher 702, and runtime activity detection 703 may correspond respectively to context builder 109, context matcher 110, and runtime activity detection 111. The control operations of system 700 may be performed by response controller 112 with respect to applications, users, or devices in networks 113.

As shown in FIG. 7, control actions that may be performed include operation 704 of controlling activity with respect to a particular application, user, or device. This may involve, for example, terminating an application, freezing an application, removing privileges associated with a user or application, denying entry to a particular access point, blocking a network communication, quarantining a network communication, etc. Operation 705 of conditioning the detected activity on further processing may involve, for example, requiring that the user provide additional authentication information (e.g., two-factor authentication, or out-of-band authentication), requiring that an administrator provide approval for the action, posing challenge questions to the user, etc. Operation 706 of modifying permissions may involve adding or removing a user or application from a group membership defining privileged access rights, modifying a privileged access certificate or token associated with a user or application, modifying a directory that includes the user (e.g., Active Directory™), etc. Operation 707 of generating an alert may include generating a visual (e.g., a GUI-based) prompt identifying the observed runtime activity, sending an email identifying the observed runtime activity, sending an SMS message identifying the observed runtime activity, etc. Operation 708 of monitoring the activity may include video-based monitoring, screen recording, keystroke recording, or other types of monitoring of the user or application involved in the observed activity. Operation 709 of logging the activity may including recording IP addresses involved in the observed activity, user names, account names, identity names, device identifiers, time and date information, communications content information, etc. Of course, other types of control actions may be performed by system 700 as well.

Figure 8:
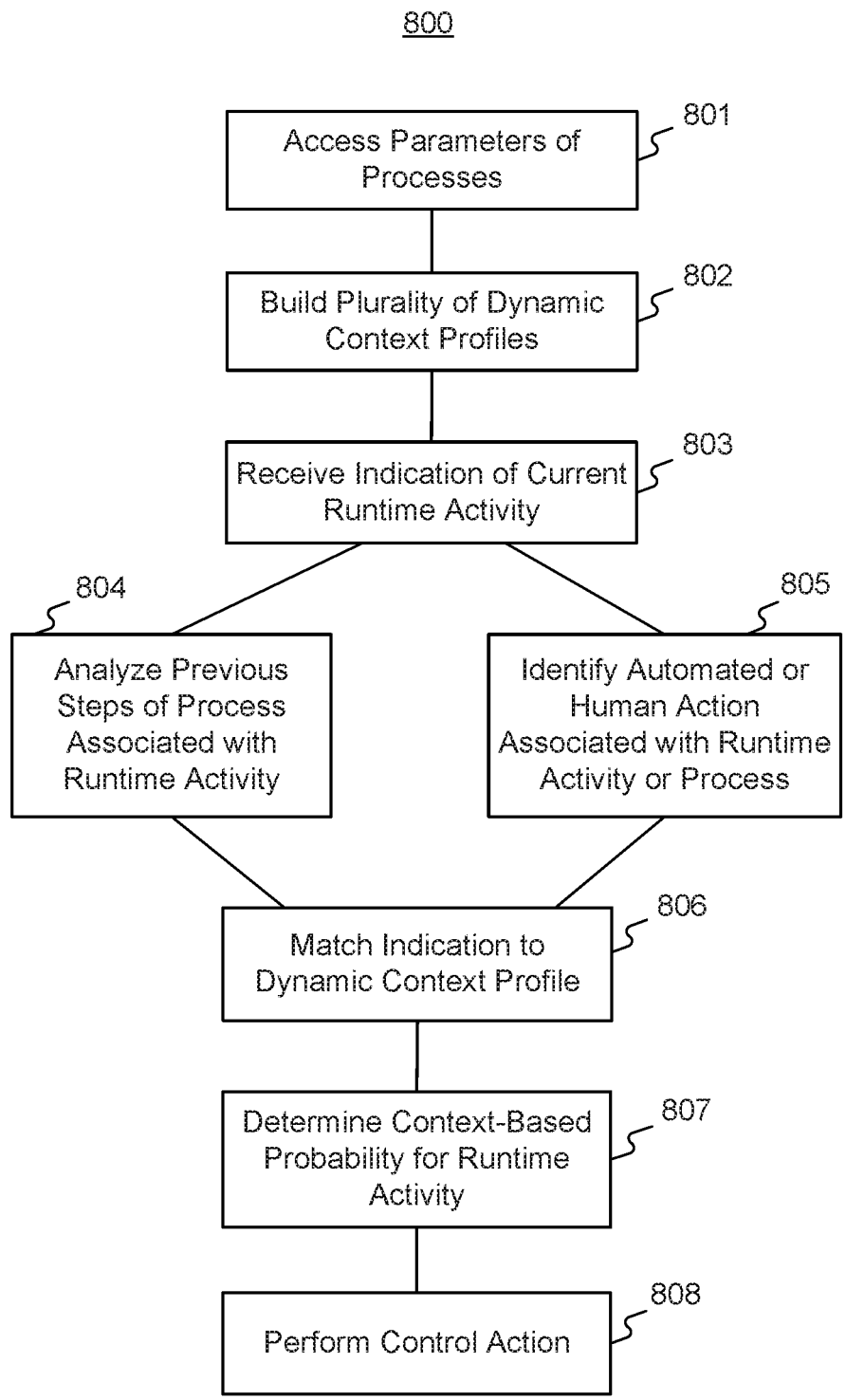
FIG. 8 is an exemplary flow diagram depicting a process for context-based analysis of requested activity in a computing environment in accordance with disclosed embodiments.

FIG. 8 is an exemplary flow diagram depicting a process 800 for context-based analysis of requested activity in a computing environment. Process 800 may be implemented in the system environment of FIG. 1. For example, process 800 may be performed by one or more of context builder 109, context matcher 110, runtime activity detection 111, and response controller 112. Various types of context profiles may be utilized in process 800, such as those discussed in connection with FIGS. 2-6, and others.

In an operation 801, process 800 may include accessing parameters of processes. Consistent with the discussion above, this may include accessing testing data environment 101 and/or live data environment 105 to obtain data regarding the actual processes that have occurred in a network environment (e.g., one or more of networks 113), or processes that have been simulated or created for testing purposes. The process parameters may correspond to an IoT network 114, cloud-based network 115, on-premises network 116, DevOps network 117, or combinations of these.

In an operation 802, process 800 may include building a plurality of dynamic context profiles for a plurality of processes in the computing environment. The dynamic context profiles, as discussed above, may be based on process data from testing data environment 101 and/or live data environment 105. In particular, the dynamic context profiles may be constructed based on static parameters 102/106, dynamic parameters 103/107, and detected activity data 104/108.

In an operation 803, process 800 may include receiving an indication of current runtime activity involving at least one identity in the computing environment. For example, as discussed in connection with FIG. 1, this may include identifying a request from an identity (e.g., user, account, or application) to perform a particular action in computing networks 113. Such a request may be, for example, downloading a file, modifying a file, connecting to another network resource, logging in to an application, seeking physical entry to a building, scheduling a file download, etc. Alternatively, receiving an indication of the current runtime activity may include receiving a report of such activity from runtime activity detection 111, monitoring the user or application performing the activity, or through other techniques.

In operations 804 and 805, process 800 may include analyzing previous steps of a process associated with the current runtime activity (e.g., as detected from live data environment 105) and identifying, based on the previous steps, an automated action or a human action associated with at least one of the current runtime activity or the process. Operations 804 and 805 may be performed as part of operation 806 of matching the indication of current runtime activity to a dynamic context profile from the plurality of built dynamic context profiles. As discussed above, the matching may be performed by context builder 109, context matcher 110, and runtime activity detection 111 based on the process data that they analyze. The matching may look for exact matches as discussed above, or may look for partial matches (e.g., based on the degree of matching, or the probability of matching). In some embodiments, the matching is based on an incomplete portion of a process (e.g., matching the first three or four steps from runtime activity to a context profile).

Based on the matching, an automated action or a human action associated with the current runtime activity or the process may be identified. An automated action may be any action or operation occurring without direct human initiation or control in a network. Examples include operations performed by or associated with a service or identity in a network, application-to-application operations or communications, application-to-resource operations or communications, application-to-sensor operations or communications, application-to-interface or application-to-display operations or communications, and more. Such automated actions may include requesting access, authenticating, reading data, writing data, deleting data, modifying data, copying data, moving data, initiating connections or tunnels, transmitting data, executing applications, etc. Human actions, on the other hand, may be detected visually (e.g., with surveillance cameras), using a variety of interfaces (e.g., sensors, touchscreens, scanners, microphones, etc.), or by detecting user input (e.g., keyboard or touchscreen input, network actions, etc.), For example, as discussed in connection with FIG. 3, a human action in the process of allowing access to a building may be the employee using their employee ID to open a gate to the parking garage. Also, in FIG. 5, a human action may be scheduling a software update for a vehicle. On the other hand, in connection with FIG. 4, an automated action that may be detected is the surveillance camera automatically detecting motion using its onboard motion detection software. Similarly, in FIG. 6, an automated action may include automatically verifying the source (e.g., author or creator) of source code under development.

In an operation 807, process 800 may include determining, based on the matching, a context-based probability that the current runtime activity is an anomalous activity, a suspicious activity, or non-valid with respect to the dynamic context profile. As discussed above regarding FIG. 1, where particular observed runtime activity does not exactly match a context profile, context matcher 110 may determine a degree of matching or a probability of matching the profile. This may be done based on assigning numerical weights to context factors or parameters, as discussed in connection with FIGS. 2-6. Alternatively, it may be done by placing the context profile in a statistical model, and determining a best fit or degree of fit compared to the detected runtime activity. The resulting degree of fit or probability of fit may identify the probability that the identified activity in the network does not match the context profile, and hence is deemed not valid. Similarly, the resulting degree of fit or probability may determine that the runtime activity is anomalous (e.g., based on a degree of deviation) or suspicious. In some embodiments, runtime activity may be deemed suspicious based on predefined categories of suspicious actions (e.g., in FIG. 3, detecting an unknown license plate, or in FIG. 5, detecting an unknown file format purporting to be a software update). Runtime activity may also be deemed suspicious in some embodiments based on the degree of deviation between the runtime activity and the dynamic context profile (e.g., exceeding a threshold of deviation). According to the techniques disclosed herein, these conclusions regarding runtime activity may be reached based on the entire observed context of the activity and the context profile itself. Consequently, even though a particular action may seem benign in isolation, it may be classified as malicious or suspicious in context.

As discussed above, increasing the number of process steps (i.e., the granularity of a process) in a context profile may result in increased reliability or confidence in matches between runtime activity and the context profile. Because there would be more points to result in matches, the resulting probability or score would be more reliable. Of course, the reliability could also be increased where certain statistically significant process steps are matched (e.g., the first three steps).

Based on the outcome of operation 807, in operation 808 process 800 may include performing a control action in association with either the current runtime activity or the process based on whether the current runtime activity is determined to be anomalous, suspicious, or non-valid. Various control options are possible, as discussed in connection with FIG. 7. In some embodiments, the degree or probability of a match with a context profile may be used to determine what control action to perform. For example, a larger degree of mismatch or a lower probability of match may determine that a stronger control action (e.g., terminating a process) is warranted as opposed to a weaker control action (e.g., generating an alert). Alternatively, any degree of mismatch may trigger a particular control action. In some embodiments, while a control action may be performed with respect to one process, other processes may continue to run despite the control action. For example, in a DevOps environment, if a control action is performed for one particular user or one particular application, other users and applications may be able to continue operating in the DevOps environment despite the control action. Similarly, in an IoT environment, if one particular network security camera is the subject of a control action, other cameras in the environment may nonetheless continue operating.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant static parameters, dynamic parameters, virtualization platforms, virtualization platform environments, trusted cloud platform resources, cloud-based assets, protocols, communication networks, security tokens, and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for context-based analysis of requested activity in a computing environment, the operations comprising:
   building a plurality of dynamic context profiles for a plurality of processes in the computing environment, wherein the plurality of dynamic context profiles are based on monitoring and analyzing at least:
   static parameters of the plurality of processes; dynamic parameters of the plurality of processes; and detected activity involving the plurality of processes, wherein each dynamic context profile comprises a number of steps; receiving an indication of current runtime activity involving at least one identity in the computing environment;
   matching the indication of current runtime activity to a dynamic context profile from the plurality of built dynamic context profiles, wherein the matching comprises:
   analyzing previous steps of a first process of a plurality of processes associated with the current runtime activity; and
   identifying, based on the previous steps, an automated action or a human action associated with at least one of the current runtime activity or the first process;
   determining, based on the matching, a context-based probability that the current runtime activity is at least one of:
   an anomalous activity, a suspicious activity, or non-valid with respect to the dynamic context profile, wherein the context-based probability has an associated confidence level where the confidence level increases as the number of steps in the dynamic context profile increases; and
   performing a control action in association with either the current runtime activity or the first process based on the context-based probability and on whether the current runtime activity is determined to be at least one of: an anomalous activity, a suspicious activity, or non-valid.

2. The non-transitory computer readable medium of claim 1, wherein receiving the indication of current runtime activity includes identifying a request from the at least one identity to perform an action in the computing environment.

3. The non-transitory computer readable medium of claim 1, wherein the plurality of dynamic context profiles are based on detected activity in a DevOps environment.

4. The non-transitory computer readable medium of claim 1, wherein the plurality of dynamic context profiles are based on detected activity requiring access across development and production environments.

5. The non-transitory computer readable medium of claim 1, wherein the plurality of dynamic context profiles are based on detected activity in a cross-platform environment.

6. The non-transitory computer readable medium of claim 1, wherein the plurality of dynamic context profiles are based on detected activity in a cloud computing environment.

7. The non-transitory computer readable medium of claim 1, wherein the plurality of dynamic context profiles are based on detected creation of identities in a cloud computing environment.

8. The non-transitory computer readable medium of claim 1, wherein the plurality of dynamic context profiles are based on detected use of applications in a cloud computing environment.

9. The non-transitory computer readable medium of claim 1, wherein the plurality of dynamic context profiles are based on human interventions involving the plurality of processes.

10. The non-transitory computer readable medium of claim 1, wherein the first process is determined to have the lowest reliability of the plurality of processes through the matching, based on a number of process steps associated with the first process.

11. The non-transitory computer readable medium of claim 1, wherein the first process is determined to involve automated processes requiring elevated privileges in order to access resources with no human involvement.

12. The non-transitory computer readable medium of claim 1, wherein the first process is determined to involve receipt of credentials associated with a human or an application.

13. The non-transitory computer readable medium of claim 1, wherein the first process is determined to be associated with a potential compromise or exploit based on the context-based probability.

14. The non-transitory computer readable medium of claim 1, wherein matching the indication of current runtime activity to the dynamic context profile includes referencing a dependents-tree associated with the current runtime activity.

15. The non-transitory computer readable medium of claim 1, wherein the operations further comprise updating a dynamic context profile from the plurality of dynamic context profiles based on the control action.

16. A computer-implemented method for context-based analysis of requested activity in a computing environment, the method comprising:

building a plurality of dynamic context profiles for a plurality of processes in the computing environment, wherein the plurality of dynamic context profiles are based on monitoring and analyzing at least:
static parameters of the plurality of processes;
dynamic parameters of the plurality of processes; and
detected activity involving the plurality of processes, wherein each dynamic context profile comprises a number of steps;
receiving an indication of current runtime activity involving at least one identity in the computing environment;
matching the indication of current runtime activity to a dynamic context profile from the plurality of built dynamic context profiles, wherein the matching comprises:
analyzing previous steps of a first process of a plurality of processes associated with the current runtime activity; and
identifying, based on the previous steps, an automated action or a human action associated with at least one of the current runtime activity or the first process;
determining, based on the matching, a context-based probability that the current runtime activity is at least one of:
an anomalous activity, a suspicious activity, or non-valid with respect to the dynamic context profile, wherein the context-based probability has an associated confidence level where the confidence level increases as the number of steps in the dynamic context profile increases; and
performing a control action in association with either the current runtime activity or the first process based on the context-based probability and on whether the current runtime activity is determined to be at least one of: an anomalous activity, a suspicious activity, or non-valid.

17. The computer-implemented method of claim 16, wherein the plurality of dynamic context profiles are built based on data from a plurality of independent data sources.

18. The computer-implemented method of claim 16, wherein the plurality of dynamic context profiles are based on detected creation or activity of identities in the cloud computing environment.

19. The computer-implemented method of claim 16, wherein the plurality of dynamic context profiles are based on detected use of applications in the cloud computing environment.

* * * * *